United States Patent
Lin

(10) Patent No.: US 12,284,503 B2
(45) Date of Patent: Apr. 22, 2025

(54) AUDIO LATENCY CALIBRATION METHOD, ELECTRONIC DEVICE AND COMPUTER-READABLE STORAGE MEDIUM

(71) Applicant: AMBIT MICROSYSTEMS (SHANGHAI) LTD., Shanghai (CN)

(72) Inventor: Po-Chang Lin, New Taipei (TW)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 202 days.

(21) Appl. No.: 18/093,792

(22) Filed: Jan. 5, 2023

(65) Prior Publication Data
US 2024/0236572 A1 Jul. 11, 2024

(51) Int. Cl.
*H04R 5/04* (2006.01)
*H04W 76/10* (2018.01)

(52) U.S. Cl.
CPC .............. *H04R 5/04* (2013.01); *H04W 76/10* (2018.02); *H04R 2400/01* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 10,706,872 B2* | 7/2020 | Elliot | G10L 21/04 |
| 11,831,935 B2* | 11/2023 | White | H04N 21/233 |
| 11,863,966 B2* | 1/2024 | Bouvigne | G06F 3/165 |
| 2023/0328307 A1* | 10/2023 | Elliot | H04L 43/0888 |
| | | | 370/503 |

FOREIGN PATENT DOCUMENTS

| | | |
|---|---|---|
| CN | 104269182 A | 1/2015 |
| CN | 105448312 A | 3/2016 |
| CN | 107110962 A | 8/2017 |
| CN | 108170398 A | 6/2018 |
| CN | 110769352 A | 2/2020 |
| CN | 112136331 A | 12/2020 |
| TW | 202236253 A | 9/2022 |

\* cited by examiner

*Primary Examiner* — Paul W Huber
(74) *Attorney, Agent, or Firm* — ScienBiziP, P.C.

(57) ABSTRACT

An audio latency calibration method is disclosed. A master speaker and a slave speaker are located at a separation distance from each other, and a paring process is performed. As the paring process is completed, multiple latency time period parameters are obtained relating to the master and slave speakers. The latency time period parameters comprise: T1+T2 representing the time that the master speaker sends an audio signal to the slave speaker, T3+T4 representing the time that the audio signal is transmitted from the slave speaker to a microphone of the master speaker, T5 representing the time that a trumpet of the master speaker plays the audio signal and T3' representing the time that a microphone of the master speaker receives the audio signal. Thus, the way to synchronously play audio signals can be achieved.

3 Claims, 4 Drawing Sheets

AUDIO LATENCY CALIBRATION METHOD, ELECTRONIC DEVICE AND COMPUTER-READABLE STORAGE MEDIUM

BACKGROUND

Technical Field

The disclosure relates to audio processing, and more particularly to an audio latency calibration method, electronic device and computer-readable storage medium.

Description of Related Art

Data transmission technology in audio transmission is well developed. However, the audio applications have increased, and requirements of audio synchronization have correspondingly increased. Thus, accuracy of audio latency becomes more important.

BRIEF DESCRIPTION OF THE DRAWINGS

Many aspects of the present disclosure can be better understood with reference to the following figures. The components in the figures are not necessarily drawn to scale, the emphasis instead being placed upon clearly illustrating the principles of the present disclosure. Moreover, in the drawings, like reference numerals designate corresponding parts throughout the several views. Implementations of the present technology will now be described, by way of embodiments, with reference to the attached figures, wherein.

DETAILED DESCRIPTION

Figure 1:
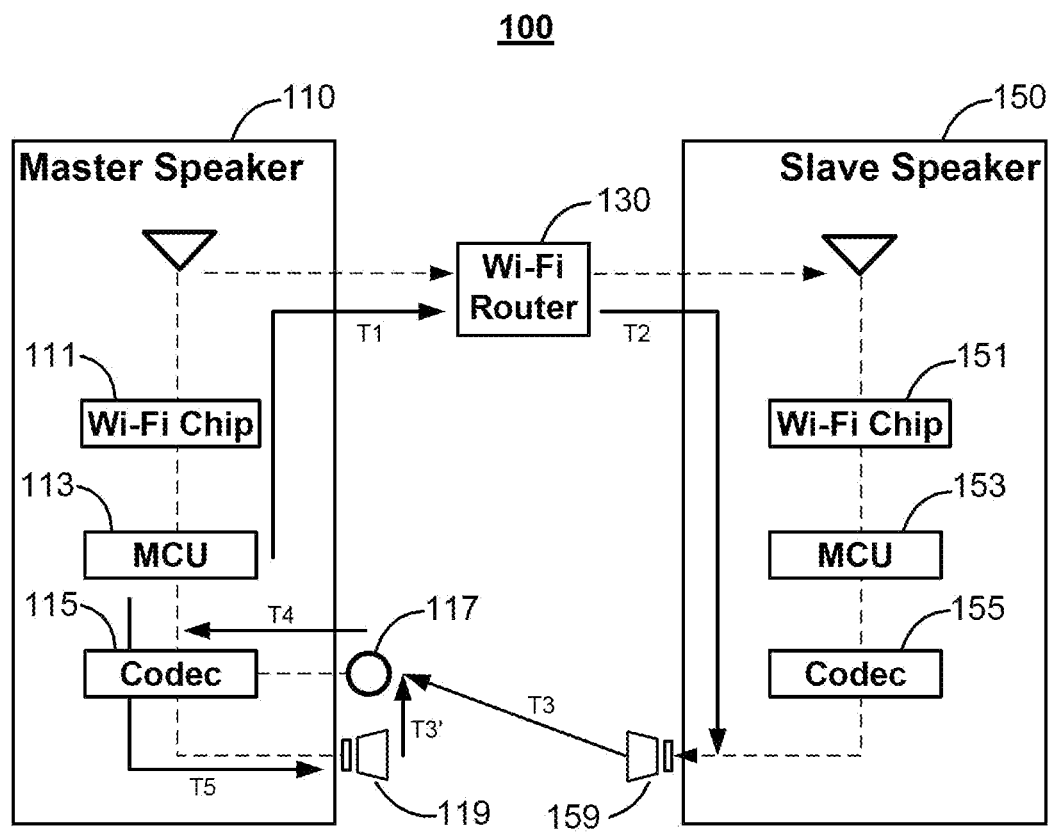
FIG. 1 is a schematic diagram of an embodiment of an audio latency calibration system of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "comprising," when utilized, means "including, but not necessarily limited to"; it specifically indicates open-ended inclusion or membership in the so-described combination, group, series, and the like.

FIG. 1 is a schematic diagram of an embodiment of an audio latency calibration system of the present disclosure. The embodiment of the audio latency calibration system 100 comprises a master device 110, a Wi-Fi router 130 and a slave device 150. The master device 110 and the slave device 150 may be speakers. The master device 110 further comprises a Wi-Fi chip 111, a micro control unit (MCU) 113, a Coder-Decoder (Codec) 115, a microphone 117 and a trumpet 119. The slave device 150 further comprises a Wi-Fi chip 151, a MCU 153, a codec 155 and a trumpet 159.

T1 represents the time that MCU 111 transmits an audio signal to the Wi-Fi router 130. T2 represents the time that the audio signal is transmitted from the Wi-Fi router 130 to the slave device 150 and played by the trumpet 159. T3 represents the time that the audio signal is transmitted from the trumpet 159 to the microphone 117. T3' represents the time that the audio signal is transmitted from the trumpet 119 to the microphone 117. T4 represents the time that the MCU 111 obtains the audio signal from the microphone 117. T5 represents the time the MCU 111 transmits the audio signal to the trumpet 119 via the codec 155.

The master device 110 transmits the audio signal to the slave device 150 via the Wi-Fi router 130, thereby obtaining latency time period T1+T2. The slave device 150 transmits the audio signal to the microphone 117, thereby obtaining latency time period T3+T4. The master device 110 transmits the audio signal to the slave device 150 and the trumpet 119 obtains the audio signal via the trumpet 159, thereby obtaining latency time period TL=T1+T2+T3+T4. The microphone 117 obtains the audio signal transmitted by the master device 110, thereby obtaining latency time period of the master device 110, $TL_{int}$=T3'+T4+T5.

When the master device 110 and the slave device 150 are located at a separation distance from each other, T3≈T3' is obtained and $TL-TL_{int}$=(T1+T2+T3+T4)−(T3'+T4+T5)=T1+T2+T5. Therefore, the latency time period that the audio signal is transmitted from the master device 110 to the slave device 150 via the Wi-Fi router 130 is T1+T2=TL−$TL_{int}$+T5. TL, $TL_{int}$ and T5 can be calculated using prior methods so that the result of T1+T2 can be obtained and audio signal synchronization can be achieved according to T1+T2.

Figure 2:
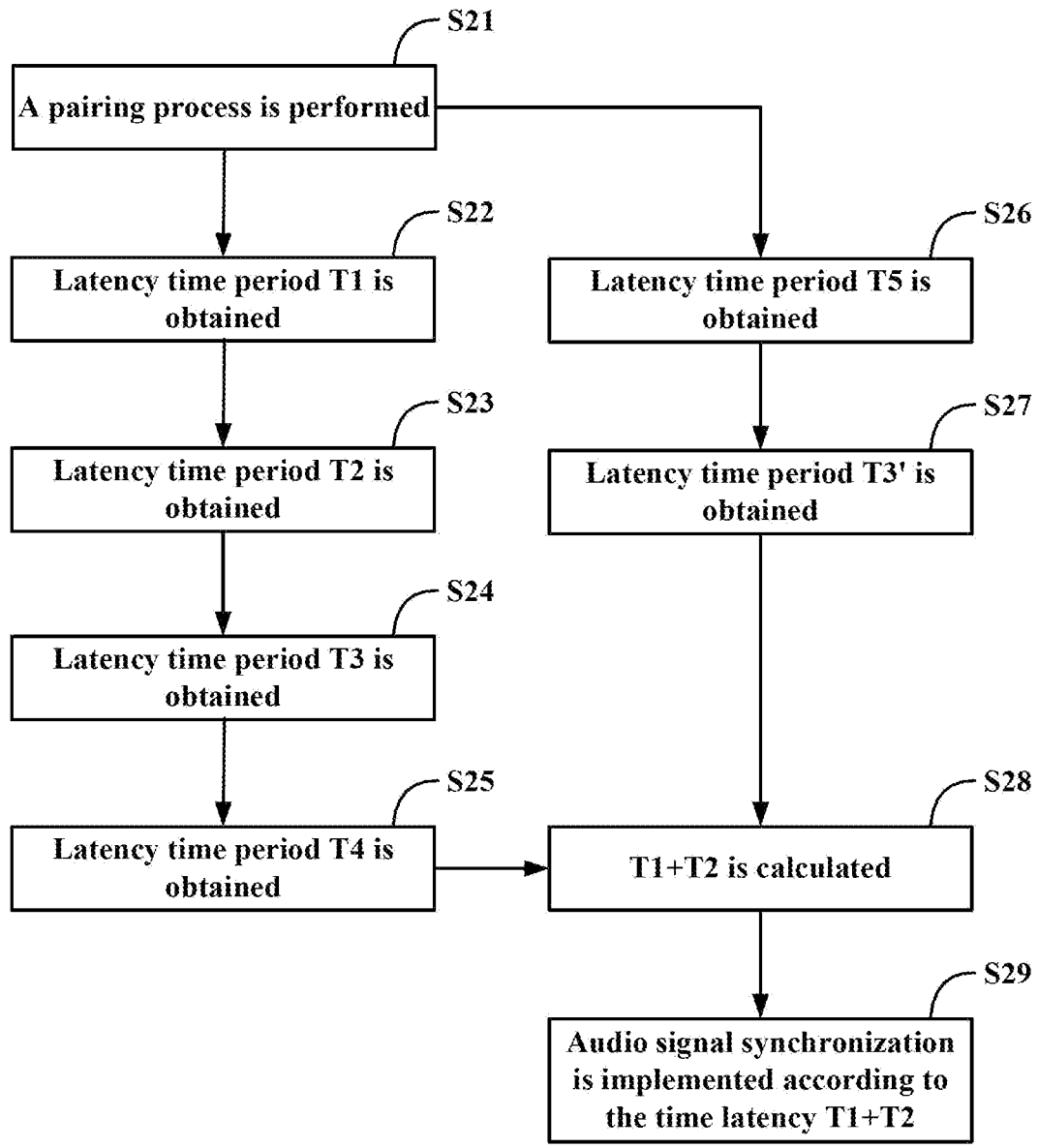
FIG. 2 is a flowchart of an embodiment of an audio latency calibration method of the present disclosure.

FIG. 2 is a flowchart of an embodiment of an audio latency calibration method of the present disclosure. According to different needs, the order of the steps in the flowchart can be changed, and some steps can be omitted.

In step S21, a master device and a slave device are located at a separation distance from each other and a pairing process is performed.

In step S22, as the pairing process is completed, the master device transmits an audio signal to the slave device via a Wi-Fi router, thereby obtaining latency time period T1.

In step S23, the slave device transmits the audio signal to a trumpet of the slave device, thereby obtaining latency time period T2.

In step S24, the slave device transmits the audio signal to a microphone of the master device via the trumpet of the slave device, thereby obtaining latency time period T3.

In step S25, the audio signal obtained by a trumpet of the master device is transmitted to the MCU of the master device, thereby obtaining latency time period T4.

In step S26, the MCU of the master device transmits the audio signal to a trumpet of the master device via a codec of the master device, thereby obtaining latency time period T5.

In step S27, the master device transmits the audio signal to a microphone of the master device, thereby obtaining latency time period T3'. As the master device and the slave device are located at the separation distance from each other, T3≃T3'.

In step S28, the latency time period TL=T1+T2+T3+T4 of the audio signal passing through the trumpet of the slave device and received by the trumpet of the master device, the latency time period $TL_{int}$=T3'+T4+T5 of the master device itself and TL−$TL_{int}$=(T1+T2+T3+T4)−(T3'+T4+T5)=T1+T2+T5 are calculated according to the described received latency time period parameters. Thus, the latency time period T1+T2 referring to the master device transmitting the audio signal to the slave device via the Wi-Fi router is equal to TL−$TL_{int}$−T5. TL, $TL_{int}$ and T5 can be calculated using prior methods so that the result of T1+T2 can be obtained In step S29, audio signal synchronization between the master device and the slave device can be achieved according to the latency time period T1+T2.

Figure 3:
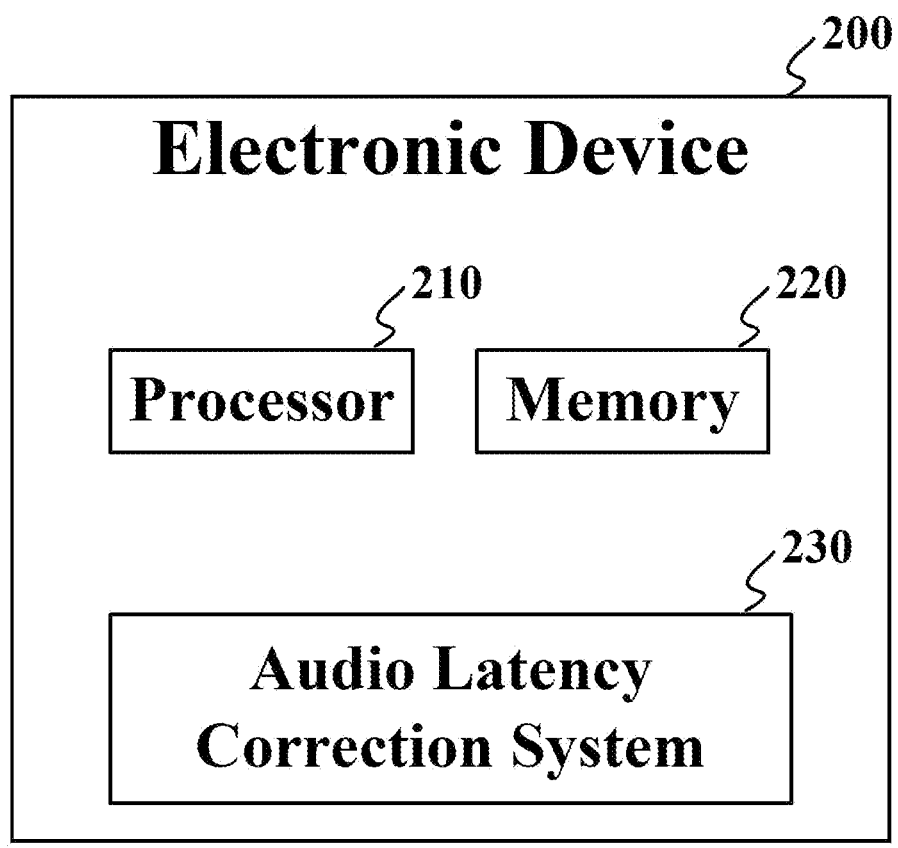
FIG. 3 is a block diagram of an embodiment of a hardware architecture of an electronic device using the method illustrated in the flow chart of FIG. 2 of the present disclosure.

FIG. 3 is a block diagram of an embodiment of the hardware architecture of an electronic device using the audio latency calibration method of the present disclosure. The electronic device 200 may be, but is not limited to, connected to a processor 210, a memory 220, and an audio latency calibration system 230 via system buses. The electronic device 200 shown in FIG. 3 may include more or fewer components than those illustrated or may combine certain components.

The memory 220 stores a computer program, such as the audio latency calibration system 230, which is executable by the processor 210. When the processor 210 executes the audio latency calibration system 230, the blocks in one embodiment of the booting mode configuration method applied in the electronic device 200 are implemented, such as blocks S11 to S17 shown in FIG. 1 and blocks S201 to S216 shown in FIG. 2.

It will be understood by those skilled in the art that FIG. 3 is merely an example of the electronic device 200 and does not constitute a limitation to the electronic device 200. The electronic device 200 may include more or fewer components than those illustrated, or may combine certain components. The electronic device 200 may also include input and output devices, network access devices, buses, and the like.

The processor 210 may be a central processing unit (CPU), or other general-purpose processors, a digital signal processor (DSP), an application specific integrated circuit (ASIC), a Field-Programmable Gate Array (FPGA), or another programmable logic device, discrete gate or transistor logic device, discrete hardware components, or the like. The processor 210 may be a microprocessor or other processor known in the art.

The memory 220 can be used to store the audio latency calibration system 230 and/or modules/units by running or executing computer programs and/or modules/units stored in the memory 220. The memory 220 may include a storage program area and a storage data area. In addition, the memory 220 may include a high-speed random access memory, a non-volatile memory such as a hard disk, a plug-in hard disk, a smart memory card (SMC), and a secure digital (SD) card, flash card, at least one disk storage device, flash device, or another volatile solid state storage device.

The audio latency calibration system 230 can be partitioned into one or more modules/units that are stored in the memory 220 and executed by the processor 210. The one or more modules/units may be a series of computer program instructions capable of performing particular functions of the audio latency calibration system 230.

Figure 4:
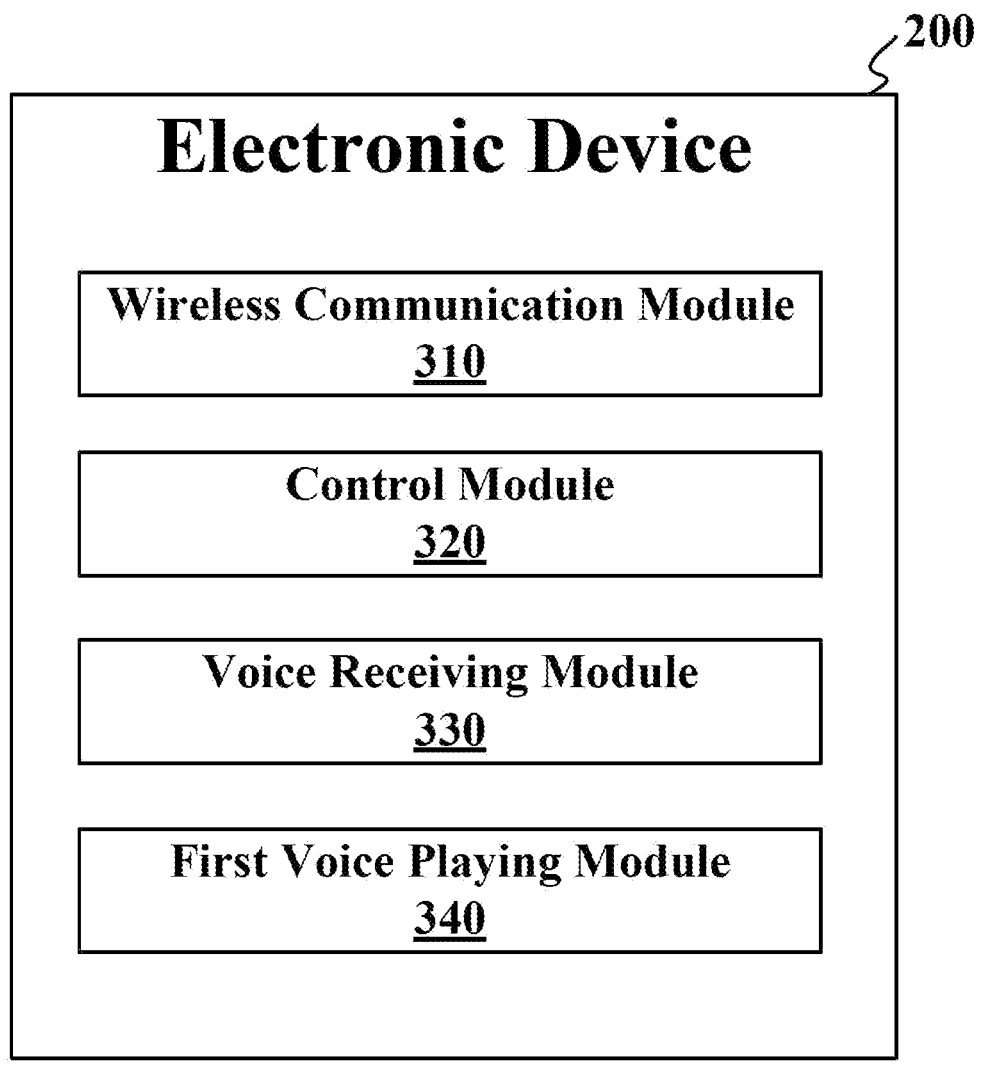
FIG. 4 is a block diagram of an embodiment of functional blocks of an intelligent audit scheduling module of the present disclosure.

FIG. 4 is a schematic diagram of an embodiment of functional blocks of the electronic device using the method of the present disclosure.

The electronic device 200, a first speaker, for example, comprises a wireless communication module 310, a control module 320, a voice receiving module 330 and a first voice playing module 340.

As the first speaker and a second speaker, namely a pairing electronic device, are located at a separation distance from each other, the wireless communication module 310 implements a pairing process to the second speaker via a Wi-Fi router.

As the pairing process is completed, the control module 310 transmits an audio signal to the second speaker via the Wi-Fi module 310, thereby obtaining latency time period T1. The second speaker transmits the audio signal to a second voice playing module (not shown) of the second speaker, thereby obtaining latency time period T2.

The voice receiving module 330 receives the audio signal transmitted from a second voice playing module (not shown) of the second speaker, thereby obtaining latency time period T3.

The first voice playing module 340 receives and transmits the audio signal to control module 320, thereby obtaining latency time period T4.

The control module 320 transmits the audio signal to the first voice playing module 340 via a first codec (not shown) of the first speaker, thereby obtaining latency time period T5.

The first voice playing module 340 transmits the audio signal to the voice receiving module 330, thereby obtaining latency time period T3'. As the first speaker and the second speaker are located at the separation distance from each other, T3≃T3'.

The latency time period TL=T1+T2+T3+T4 of the audio signal passing through the second trumpet (not shown) of the second speaker and received by the first voice playing module 340, the latency time period $TL_{int}$=T3'+T4+T5 of the first speaker itself and TL−$TL_{int}$=(T1+T2+T3+T4)−(T3'+T4+T5)=T1+T2+T5 are calculated according to the described received latency time period parameters using the control module 320. Thus, the latency time period T1+T2 referring to the first speaker transmitting the audio signal to the second speaker via the Wi-Fi router is equal to TL−$TL_{int}$−T5. TL, $TL_{int}$ and T5 can be calculated using prior methods so that the result of T1+T2 can be obtained.

The control module 320 implements audio signal synchronization between the first speaker and the second speaker according to the latency time period T1+T2.

It is to be understood, however, that even though numerous characteristics and advantages of the present disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. An audio latency calibration method executable by a first electronic device, the audio latency calibration method comprising:

performing a pairing process when the first electronic device and a second electronic device are positioned at a separation distance from each other;

when the pairing process is complete, transmitting an audio signal to the second electronic device via a Wi-Fi router, thereby obtaining a latency time period T1, wherein the second electronic device transmits the audio signal to a second trumpet of the second electronic device, thereby obtaining a latency time period T2;

a first microphone of the first electronic device receiving the audio signal transmitted by the second trumpet of the second electronic device, thereby obtaining a latency time period T3;

transmitting the audio signal received by the first microphone of the first electronic device to a first micro control unit (MCU) of the first electronic device, thereby obtaining a latency time period T4;

transmitting the audio signal to a first trumpet of the first electronic device using the MCU of the first electronic device via a codec of the first electronic device, thereby obtaining a latency time period T5;

transmitting the audio signal to the first microphone through a first speaker of the first electronic device via the first trumpet, thereby obtaining a latency time period T3', wherein because the first electronic device and the second electronic device are positioned at the separation distance from each other, $T3 \simeq T3'$;

calculating a latency time period $TL=T1+T2+T3+T4$ of the audio signal passing through the second trumpet and received by the codec of the first electronic device, a latency time period $TL_{int}=T3'+T4+T5$ of the first electronic device, and $TL-TL_{int}=(T1+T2+T3+T4)-(T3'+T4+T5)-T1+T2+T5$ according to the obtained latency time periods T1, T2, T3, T4, T5 and T3', thereby obtaining the latency time period $T1+T2=TL-TL_{int}-T5$; and implementing audio signal synchronization between the first electronic device and the second electronic device according to the latency time period T1+T2.

2. A non-transitory computer-readable storage medium storing a program which causes a computer to execute:

a process of performing a pairing process when the first electronic device and a second electronic device are located at a separation distance from each other;

a process of, as the pairing process is completed, transmitting an audio signal to the second electronic device via a Wi-Fi router, thereby obtaining a latency time period T1, wherein the second electronic device transmits the audio signal to a second trumpet of the second electronic device, thereby obtaining a latency time period T2;

a process of, receiving the audio signal transmitted by the second trumpet of the second electronic device using a first microphone of the first electronic device, thereby obtaining latency time period T3;

a process of transmitting the audio signal obtained by the first microphone of the first electronic device to a first MCU of the first electronic device, thereby obtaining a latency time period T4;

a process of transmitting the audio signal to a first trumpet of the first electronic device using the MCU of the first electronic device via a codec of the first electronic device, thereby obtaining a latency time period T5;

a process of transmitting the audio signal through the first speaker via the first trumpet, thereby obtaining a latency time period T3', wherein as the first electronic device and the second electronic device are located at the separation distance from each other, $T3 \simeq T3'$;

a process of calculating the latency time period $TL=T1+T2+T3+T4$ of the audio signal passing through the second trumpet and received by the codec of the first electronic device, a latency time period $TL_{int}=T3'+T4+T5$ of the first electronic device itself and $TL-TL_{int}=(T1+T2+T3+T4)-(T3'+T4+T5)-T1+T2+T5$ according to the obtained latency time periods T1, T2, T3, T4, T5 and T3', thereby obtaining the latency time period $T1+T2=TL-TL_{int}-T5$; and a process of implementing audio signal synchronization between the first electronic device and the second electronic device according to the latency time period T1+T2.

3. An electronic device, which includes a memory, a processor, and a serial number length adjustment program stored in the memory and operable on the processor, wherein the audio latency calibration program is executed by the processor to implement following steps:

performing a pairing process when the first electronic device and a second electronic device are positioned at a separation distance from each other;

when the pairing process is complete, transmitting an audio signal to the second electronic device via a Wi-Fi router, thereby obtaining a latency time period T1, wherein the second electronic device transmits the audio signal to a second trumpet of the second electronic device, thereby obtaining a latency time period T2;

a first microphone of the first electronic device receiving the audio signal transmitted by the second trumpet of the second electronic device, thereby obtaining a latency time period T3;

transmitting the audio signal received by the first microphone of the first electronic device to a first micro control unit (MCU) of the first electronic device, thereby obtaining a latency time period T4;

transmitting the audio signal to a first trumpet of the first electronic device using the MCU of the first electronic device via a codec of the first electronic device, thereby obtaining a latency time period T5;

transmitting the audio signal to the first microphone through a first speaker of the first electronic device via the first trumpet, thereby obtaining a latency time period T3', wherein because the first electronic device and the second electronic device are positioned at the separation distance from each other, $T3 \simeq T3'$;

calculating a latency time period $TL=T1+T2+T3+T4$ of the audio signal passing through the second trumpet and received by the codec of the first electronic device, a latency time period $TL_{int}=T3'+T4+T5$ of the first electronic device, and $TL-TL_{int}=(T1+T2+T3+T4)-(T3'+T4+T5)-T1+T2+T5$ according to the obtained latency time periods T1, T2, T3, T4, T5 and T3', thereby obtaining the latency time period $T1+T2-TL-TL_{int}-T5$; and implementing audio signal synchronization between the first electronic device and the second electronic device according to the latency time period T1+T2.

* * * * *